May 28, 1929.   F. K. GRUSS   1,714,868
VACUUM BRAKE
Filed March 22, 1927   2 Sheets-Sheet 1
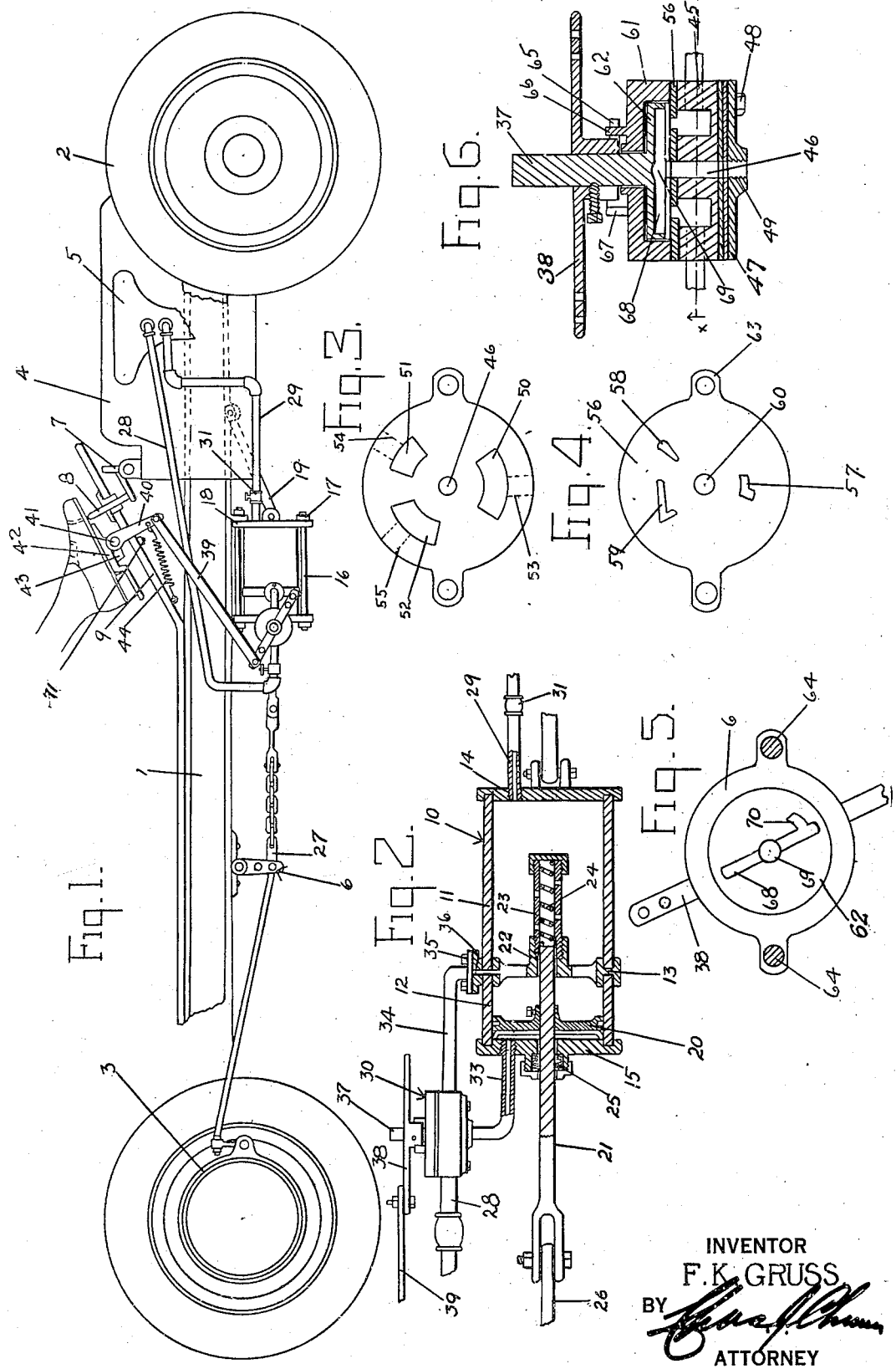
INVENTOR
F. K. GRUSS
BY
ATTORNEY May 28, 1929.  F. K. GRUSS  1,714,868
VACUUM BRAKE
Filed March 22, 1927   2 Sheets-Sheet 2
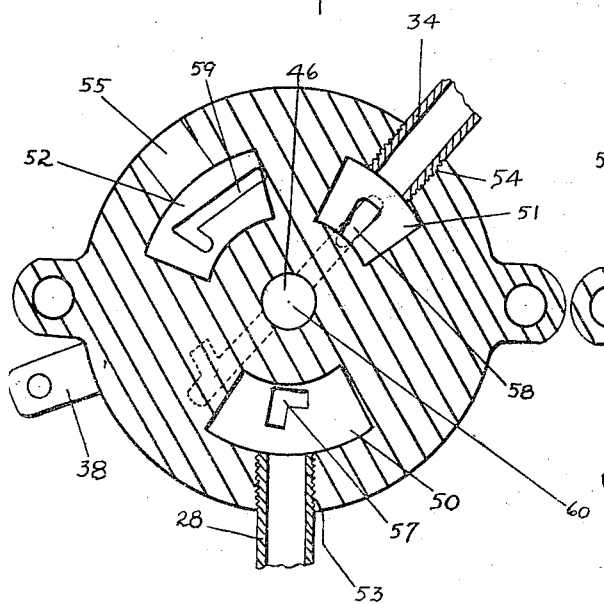
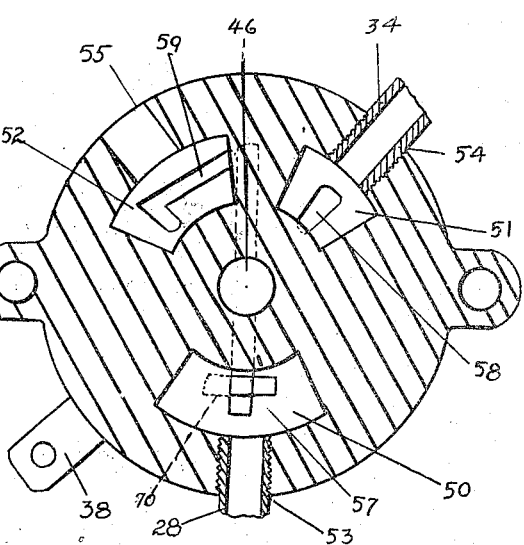
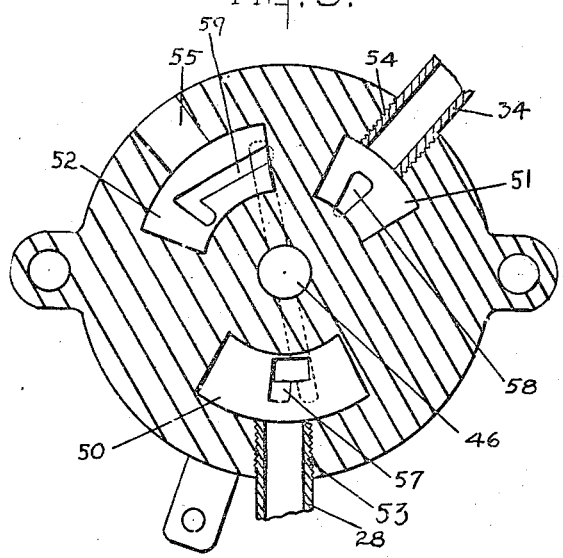
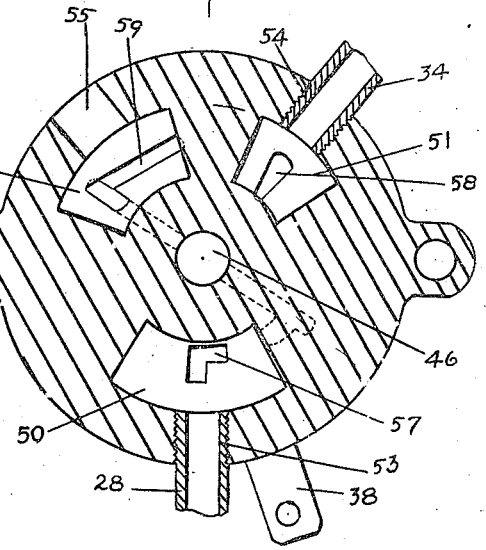
INVENTOR
F.K.GRUSS
BY 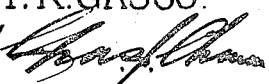
ATTORNEY Patented May 28, 1929.

1,714,868

UNITED STATES PATENT OFFICE.

FRANCIS K. GRUSS, OF REDWOOD CITY, CALIFORNIA, ASSIGNOR OF ONE-THIRD TO FRANCIS J. GRUSS, OF REDWOOD CITY, CALIFORNIA, ONE-THIRD TO RAYMOND L. GRUSS, OF SAN FRANCISCO, CALIFORNIA, AND ONE-THIRD TO HIMSELF, LUCIAN ABADIE, OF BERKELEY, CALIFORNIA, AND FRANCIS J. GRUSS, OF REDWOOD CITY, CALIFORNIA, AS TRUSTEES.

VACUUM BRAKE.

Application filed March 22, 1927. Serial No. 177,234.

This invention relates to improvements in motor vehicle brakes of the type disclosed in my pending application for patent entitled Vacuum brakes, filed Dec. 14, 1925, Serial No. 75,163.

One of the objects of the invention is to provide vacuum brake apparatus which will consist of fewer parts, be less expensive, capable of being more readily and easily installed and which will operate much more efficiently than vacuum brake apparatus such as heretofore employed.

Another object of the invention is to provide an especially constructed operating cylinder which serves as a storage chamber as well as an operating cylinder and simplifies and lessens the cost of the apparatus as compared to the previous vacuum brake apparatus.

A further object is to provide an improved valve with which a more efficacious operation and control of the novel vacuum brake of this invention may be had, the valve being simple as to construction, small, compact and reliable in operation.

In the invention of the above mentioned application there was provided a cylinder having a piston therein connected with the brake rigging in such manner that the brakes would be set and released on movement of the piston. The intake manifold of the engine was connected with the cylinder so that the vacuum force of the engine could be applied to the cylinder. Associated with this connection was a special valve which when in one position provided for applying an equal suction force on opposite sides of the piston, and within the cylinder thereby maintaining the brakes in "off" position. In another position this valve provided for communication of one end of the cylinder with the atmosphere in order to diminish the suction force on one side of the piston and to permit the suction force on the other side to effect movement of the piston and thereby operate the brakes. In this last named position the valve established a direct communication between the end of the cylinder in which the suction force was diminished and the intake manifold, whereby a thorough and effective control of the braking operation might be had. Although this direct communication with the manifold while admitting the atmospheric air to the cylinder and also the manifold, is a highly desirable condition essential to the quick response of the brakes when the valve is operated in both applying and releasing the brakes, in some instances it proves a disadvantage. This disadvantage is manifested when the automobile is brought to a low speed or to a full stop, and the engine is running at slow speed or "idling", because the introduction into the manifold of atmospheric air in the amount as would be required to fully apply the brakes would in some instances, change the combustible mixture passing into the engine to the extent that the engine would cease to function or "stall". Consequently the valve of this invention is designed to overcome this objection and provides for shutting off of communication between the intake manifold and the atmosphere when the brakes are fully applied. However, in the ordinary operation of an automobile, the full application of the brakes is seldom required and consequently the efficiency loss in controlling the brakes which takes place when shutting off direct communication between the source of suction force and the operating cylinder, does not occur often enough to prove objectionable. While the automobile is in motion the brakes are seldom fully applied and the small amount of atmospheric air which is drawn into the engine through the manifold in the ordinary application of the brakes, does not cause any appreciable ill effects in the operation of the engine.

Another object of the invention is the provision for readily incorporating the apparatus of the invention with present type of mechanical brakes as generally used on automobiles without necessitating any appreciable changes in the construction and arrangement of the brakes, it being possible with the apparatus of this invention to use the ordinary brakes when desired, with the same effectiveness as before installation of the vacuum brake, although it will only be necessary to use the foot brakes should, for any reason the vacuum brake of this invention fail to operate.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a fragmentary view of an automobile showing in side elevation the brake mechanism of my invention as applied thereto, Fig. 2 represents an enlarged longitudinal sectional view of a part of the mechanism of my invention, Fig. 3 represents a top plan view of a part of the valve mechanism, Fig. 4 represents a top plan view of another part of the valve mechanism, Fig. 5 represents a bottom plan view of the rotatable parts of the valve mechanism, Fig. 6 represents a vertical sectional view of the valve mechanism as when assembled.

Fig. 7 represents a sectional view of the valve showing parts thereof in position when the brake is in "off" position, Fig. 8 represents a sectional view of the valve showing parts thereof in position when one of the two vacuum pipe connections between the cylinder and intake manifold is cut out and the other one cut in with the cylinder, Fig. 9 represents a view similar to Fig. 8, showing the valve parts in position when the brake is applied, and Fig. 10 is a view similar to Fig. 9 showing the valve parts in position when the brake is fully applied, Figs. 7 to 10 inclusive being taken on the line x—x of Fig. 6.

The embodiment of the invention which is illustrated in the accompanying drawing is applied to an automobile of which there is shown in Fig. 1, a frame or chassis 1, wheel 2, wheel carried brake mechanism 3, internal combustion engine 4, intake manifold 5, brake rigging 6, throttle operating mechanism 7, accelerator for the throttle 8, and foot board 9. The apparatus of my invention includes an operating cylinder 10 consisting of two sections 11 and 12 interposed between which is a spider 13. On the ends of the cylinder are removable heads 14 and 15 which are held in place by means of bolts 16 having nuts 17 turned thereon, which bolts also hold the two sections of the cylinder assembled. This sectional construction is employed to facilitate the assembling and disassembling of the working cylinder. The cylinder is mounted in any suitable manner on the frame 1 of the automobile, it being secured in the present instance by fastenings 18 and 19. A piston 20 is mounted for reciprocation within the cylinder upon a piston rod 21. The piston rod 21 operates in a bearing 22 provided on the spider 13 and is adapted to extend into a tubular spring holder 23 removably mounted upon the bearing 22. In this spring holder is an expansion spring 24 against one end of which the piston rod engages, said spring serving to return the piston to its normal position, as will be later more fully described. The piston rod extends through a stuffing box 25 in the head 15 and on its outer end is connected with a flexible element such as a chain 26, the chain being connected with the usual crank arm 27 forming a part of the brake rigging 6. This flexible connection provides for independent operation of the ordinary foot brakes such as present day automobiles are equipped with, it being thought unnecessary to illustrate this brake mechanism in detail.

The working cylinder is connected with the intake manifold 5 so that the suction forces of the engine 4 may be applied to the cylinder in order to operate the piston therein. In the present instance two pipe lines designated 28 and 29 are employed to establish this communication between the cylinder and manifold. The pipe 28 communicates with the rear end of the cylinder on one side of the piston through the especially constructed valve 30 of this invention, whereas the pipe 29 communicates directly with the other end of the cylinder, there being a check valve 31 in the pipe 29. The valve 30 is mounted upon a short elbow pipe 33 carried by the head 15 of the cylinder. Extending from one side of the valve as will be later more fully described, is a pipe 34 which is connected with the spider 13 by a fastening means 35 so that it registers with a port or passage 36 which extends through the spider and establishes communication of the interior of the cylinder with the pipe 34.

The stem 37 of the valve is provided with a T-handle 38 facilitating operation thereof when the valve is located in different positions, either by a push or pull action on the handle. In any event this handle is connected by a link 39 with a bell crank 40 both on a pedal mounting 41 carried on the foot board 9. The pedal 42 is of special construction to fit the ball of the foot and the heel of the foot, and is pivoted on the mounting 41 so that when the heel portion of the pedal is depressed it will engage the upper end 43 of the bell crank and rock the bell crank so as to pull on the link 39 and through the handle 38 turn the valve stem 37 and operate the valve. The accelerator 8 is located close to but spaced from the front end of the pedal 42 in such position that the foot of the operator as shown in Fig. 1, will extend over the upper end of the accelerator. The pedal serves as a rest and fulcrum for the foot when the toe portion of the foot is pushed downward to depress the accelerator and to open the throttle, not shown. In this way when fuel is fed to the engine through the throttle operation, the brake valve is not operated but when the heel portion of the pedal is depressed as when releasing the accelerator, the operator may by continuing to depress the heel, operate the valve so as to operate the brakes. By means of a spring 44, the valve operating mechanism will be returned to normal position when the foot pressure is removed therefrom.

When the valve is in its normal position during the operation of the automobile, suction force of the engine is applied to the working cylinder so as to maintain the piston in a position to hold the brakes released. At this time the suction force is applied through the pipe 29, the pipe 34, valve and pipe 33 thereby establishing an equal suction force on both sides of the piston. The next movement of the valve brings the pipe 28 into communication with the cylinder through the valve and pipe 33 and shuts off communication of the valve with the pipe 34, thereby causing a suction force from the two pipes to be applied to the ends of the cylinder and the piston to be maintained in the same position so as to hold the brakes released. The next movement of the valve opens an atmospheric port of the valve so as to communicate the end of the cylinder on one side of the piston with the atmosphere through the pipe 33, this also communicating the pipe 28 with the atmosphere while maintaining said pipe in direct communication with said end of the cylinder whereby the piston will respond quickly to the action of the suction force within the cylinder and provide for an effective control of the brakes in applying and releasing them. The next position of the valve provides for increasing the size of the atmospheric opening to its fullest extent to bring about a full application of the brakes by a quick admission of atmospheric air into said end of the cylinder and a quick diminution of said suction force, but when in this position the valve shuts off communication between the pipe 28 and the said end of the cylinder, thereby preventing atmospheric air from being drawn into the manifold. These four positions of the valve are shown in Figs. 7 to 10 inclusive.

The valve comprises a circular disk-like body portion 45 having a central opening 46 extending therethrough. On the under side of the body portion is an attaching plate 47 secured thereto by screws 48 and provided with a central screw threaded opening 49 into which the pipe 33 is screwed, said pipe being in registration with the opening 46. Cut into the body from the upper face thereof are arcuate recesses designated 50, 51 and 52, arranged in a circular series around the central opening 46. Openings 53, 54 and 55 are tapped through the periphery of the body into the recesses 50, 51 and 52. The pipe 28 leading from the manifold is screwed into the opening 53 and therefore communicates with the recess 50, whereas the pipe 34 is screwed into the opening 54 and communicates the front end of the cylinder with the recess 51. The other opening 55 establishes communication of the recess 52 with the atmosphere. A valve plate 56 is mounted on top of the body portion so as to extend over said recesses. The plate is shown in top plan view in Fig. 4, and is provided with a small L-shaped port or opening 57 which registers with but is considerably smaller than the recess 50. Another small port 58 is provided in the plate 56 and registers with the recess 51. Another small L-shaped port 59 is provided in the plate 56 and registers with the recess 52. In the center of the plate is an opening 60 registering with the opening 46 in the valve body. Mounted on the upper side of the valve plate is a valve casing 61 containing a rotary circular disk valve 62. The plate 56 and the body are provided with registering apertured ears 63 in which fastenings 64 are mounted to secure these parts in assembled position. The rotary disk valve 62 is carried on the lower end of the stem 37 which supports the handle 38 as previously described, there being a stop lug 65 on the handle adapted to engage similar stop lugs 66 and 67 provided on the valve casing to limit the movement of the valve to extreme "off" and "on" positions. The under or inner face of the valve is provided with an elongated recess or passage 68 which extends transversely of the valve across the center thereof with its ends spaced from the periphery of the valve. This recess or passage is provided with a central enlargement 69 which is in registration with the opening 60 in the valve plate. Near one end of the recess is a lateral enlargement designated 70.

*Operation.*

The valve is normally held in position shown in Fig. 7 by means of the spring 44 and the stop member 71 which limits movement of the bell crank 40. When in this position the piston which, as will be noted with reference to Fig. 2, is disposed close to one end of the cylinder leaving but a comparatively small space between it and the adjacent head of the cylinder, will be maintained in this position and the brakes will be maintained in "off" or released position. The suction force from the engine is applied to the front end of the cylinder through the manifold 5 and pipe 29. At this time the force is not applied to the cylinder through the pipe 28 which communicates with the recess 50 in the valve because the communicating passage 68 in the rotary valve is not in registration with the recess 50 it being, to the contrary, in registration with the opening 46 and the recess 51. Since this recess 51 is communicated with the front end of the cylinder by means of the pipe 34 and the passage 46 leading into the cylinder, the suction force is applied through this recess 51, opening 58, valve passage 68, opening 60 in the plate, opening 46 in the body portion of the valve and through the pipe 33 to the front end of the cylinder. In this way an equal suction force is established on both sides of the piston, which piston together with the other parts are in such position as to maintain the brakes released. The check valve 31 in the pipe 29 operates to maintain the suction force at all times in the front end of the cylinder and inasmuch as it is necessary to provide for a communication of the other end of the cylinder with the manifold (except when the brakes are fully applied) and at the same time that said end of the cylinder is vented to the atmosphere, it is therefore necessary for the valve to next connect into the system, the second vacuum pipe 29 which is connected with the manifold. When the operator desires to apply the brakes, on the first depressing movement of the heel portion of the pedal 42, the terminal 43 of the bell crank is engaged and the bell crank is rocked so as to pull on the lug and turn the valve to the extent that it assumes the position shown in Fig. 8. At this time the valve passage 68 in the rotary element 62 of the valve, moves out of communication with the opening 58 which is in communication with the front end of the cylinder and thereby shuts off from communication with the valve, said front end of the cylinder. This valve passage however, moves so that it communicates with the recess 50 to which the manifold pipe 28 is connected, said communication being through the L-shaped port or opening 57 in the stationary valve plate 56. Since this passage is at all times in communication with the opening 60 that leads to the rear end of the cylinder through the pipe 33, when the valve is in position shown in Fig. 8, the suction force in the rear end of the cylinder is effected through the pipe 28 instead of the pipe 29, which change of the application of the suction force to the rear end of the cylder is a quick one, taking place incidentally with the first movement of the valve out of its normal position thereby putting the brake apparatus in condition for properly controlling the application of the brakes. The next movement of the valve brings the parts into position shown in Fig. 9, providing for a differential of suction forces such that the piston will be moved to apply the brakes. In this position the valve passage 68 is in registration with one end of the L-shaped port 57, also the ports 60 and 59. Atmospheric air then rushes through the opening 55, recess 52, L-shaped port 59, valve passage 68, opening 60, port 46, thence through pipe 33 to the rear of the cylinder. This immediately reduces the suction force in said end of the cylinder sufficiently to cause the suction force in the other end to become an effective medium for moving the piston so as to apply the brakes. The brakes are applied through the rod 21, chain 26, crank arm 27, which latter through the rigging 6, applies the brakes. A gradual movement of the valve into its third position indicated in Fig. 9, will bring about a gradual application of the brakes inasmuch as the atmosphere is gradually admitted into the cylinder. A quick braking operation may be effected by a quick movement of the valve as will be obvious. Unless the valve is moved its full extent into open position, bringing the entire L-shaped port 59 into communication with the recess 68, the direct communication between the manifold and rear end of the cylinder is maintained. In the ordinary application of the brakes as when the automobile is under way, it is seldom necessary to fully apply the brakes of this invention. Therefore the essential provision for maintaining the rear end of the cylinder in communication with the manifold during the ordinary braking operation is not interfered with. By maintaining the communication of the rear end of the cylinder with the manifold during the time that the suction force is diminished within said rear end of the cylinder, it is possible to bring about a quick operation of this apparatus and the like response of the brakes with the brakes under full control of the operator at all times. If after a slight application of the brakes is effected, the operator releases the pedal and allows the atmospheric communication through the valve to be shut off, the suction force in the cylinder will be immediately established, equally on both sides of the piston and the piston will move by the action of the spring 24 to position to quickly release the brakes.

By disposing the piston 20 close to one end of the cylinder, not only is the space between the other end of the cylinder and the piston made suitable as a suction storage compartment which will insure an effective suction action regardless of variations which may take place in the suction line between the check valve 31 and the engine, but there is also provided a comparatively small cylinder space in which the suction force may be very quickly varied as desired to bring about an application of the brakes, and a release of the brakes. This small space in which the suction force is diminished to apply the brakes and restored to release the brakes, insures a minute and flexible control of the braking operation.

Inasmuch as the valve passage 68 registers at one end as shown in Fig. 8, with the port 57 before the other end of the passage is moved into registration with the atmosphere port 59, it follows that when the second named end of said passage registers with the port 59, the other end of the passage moves relative to the port 57. When registration of these passages and ports is effected as shown in Fig. 9, so as to apply the brakes, the lateral extension 70 of the passage 68 is in full registration with the lateral leg of the port 57. With the valve in this position, the brakes are applied but slightly. To increase the movement of the piston 20 and further apply the brakes, the operator further depresses the heel of the pedal 47 which moves the valve 62 so that the passage 68 is maintained in registration with the longer leg of the port 59 and the other end of the valve moves to the right of the port 57 decreasing the size of the opening which communicates the said port with said passage. This is due to the lateral extension 70 and the L-shaped port 57. When the end of the lateral extension 70 moves past the adjacent edge of the port 57, the size of this port is decreased so that the suction force which is effective in the cylinder is likewise decreased. This diminution of the suction force in the smaller compartment of the cylinder makes the effective suction force in the larger compartment active to further move the piston and further apply the brakes. Thus it will be seen that continued movement of the valve causes the gradual closing up of the port 57 and brings about an increasing braking force. The final movement of the valve to apply the brakes, brings the passage into registration with the shorter end of the port 59 and shuts off the port 57 entirely for the purpose previously described. These peculiarly shaped ports provide for great flexibility in the operation of the brakes, permitting the operator to apply them to the desired degree with great ease and accuracy. A slight depressing movement of the heel of the pedal brings about a slight braking operation which may be increased by increasing the pedal movement. It will thus be seen that not only is the suction force in the smaller compartment of the cylinder diminished by a direct intaking of atmospheric air into said cylinder but by controlling the degree of communication of said end of the cylinder with the intake manifold and further diminishing the suction force in this manner.

I claim:

1. The combination with a motor vehicle including an internal combustion engine and brake mechanism, of a cylinder, a piston reciprocally mounted within the cylinder, a piston rod carried by the piston, means of connection between the piston rod and the brake mechanism providing for operation of the latter on movement of the piston, means establishing communication between the intake manifold of the engine and the ends of the cylinder for creating a suction force within the cylinder which last named means includes valve means for controlling the suction force, which valve means when in one position will permit of an equal suction force within the cylinder on opposite sides of the piston and when in another position will communicate the portion of the cylinder on one side of the piston with the atmosphere while maintaining said portion of the cylinder in direct communication with the intake manifold, and which valve means when in another position will communicate said portion of the cylinder with the atmosphere and shut off communication between said portion of the cylinder and the intake manifold.

2. The combination with a motor vehicle including an internal combustion engine and brake mechanism, of a cylinder, a piston reciprocally mounted within the cylinder, means of connection between the piston and said brake mechanism providing for operation of the latter upon movement of the piston, a valve member having ports therein, pipes extending from said ports to and being communicated with portions of the cylinder on opposite sides of the piston, a pipe connecting another of said ports with the intake manifold, another pipe connecting the portion of the cylinder on one side of the piston with the manifold, a check valve in the last named pipe operating to maintain within the cylinder the suction force established therein through said pipe, another of said valve ports communicating with the atmosphere and a movable valve member associated with the ported valve member and operated when in one position to establish a communication through the valve between one end of the cylinder with the other, and which when in another position communicates the first named manifold connected pipe, each with one end of the cylinder, and when in another position communicates the atmospheric port with the first named manifold connected pipe and that portion of the cylinder on one side of the piston.

3. The combination with a motor vehicle including an internal combustion engine and brake mechanism, of a cylinder, a piston reciprocally mounted within the cylinder, means of connection between the piston and said brake mechanism providing for operation of the latter upon movement of the piston, a valve member having ports therein, pipes extending from said ports to and being communicated with portions of the cylinder on opposite sides of the piston, a pipe connecting another of said ports with the intake manifold, another pipe connecting the portion of the cylinder on one side of the piston with the manifold, a check valve in the last named pipe operating to maintain within the cylinder the suction force established therein through said pipe, another of said valve ports communicating with the atmosphere and a movable valve member associated with the ported valve member and operated when in one position to establish a communication through the valve of one end of the cylinder with the other, and which when in another position communicates the first named manifold connected pipe, each with one end of the cylinder, and when in another position communicates the atmospheric port with the first named manifold connected pipe and that portion of the cylinder on one side of the piston and which in another position shuts off communication between the manifold and said portion of the cylinder while maintaining said portion of the cylinder in communication with the atmosphere.

4. The combination with a motor vehicle including an internal combustion engine and brake mechanism, of a cylinder, a piston reciprocally mounted within the cylinder, a piston rod carried by the piston, means of connection between the piston rod and the brake mechanism providing for operation of the latter on movement of the piston, means establishing communication between the intake manifold of the engine and the ends of the cylinder for creating a suction force within the cylinder which last named means includes valve means for controlling the suction force, which valve means when in one position will permit of an equal suction force within the cylinder on opposite sides of the piston and when in another position will communicate the portion of the cylinder on one side of the piston with the atmosphere while maintaining said portion of the cylinder in direct communication with the intake manifold, said valve means when moved in one direction from the last named position acting to gradually shut off communication between said portion of the cylinder and the intake manifold.

5. The combination with a motor vehicle including an internal combustion engine and brake mechanism, of a cylinder, a piston reciprocally mounted within the cylinder, a piston rod carried by the piston, means of connection between the piston rod and the brake mechanism, means establishing connection between the intake manifold and the engine and the ends of the cylinder for creating an equal suction force within the cylinder, which means of communication includes valve means which during movement thereof in one direction gradually admits a greater quantity of atmospheric air into said portion of the cylinder while gradually shutting off communication between said portion of the cylinder and said intake manifold.

6. The combination with a motor vehicle including an internal combustion engine and brake mechanism, of a cylinder, a piston reciprocally mounted within the cylinder, a piston rod carried by the piston, means of connection between the piston rod and the brake mechanism, means establishing connection between the intake manifold of the engine and the ends of the cylinder for creating an equal suction force within the cylinder, which means of communication includes valve means which during movement thereof in one direction gradually admits a greater quantity of atmospheric air into said portion of the cylinder while gradually shutting off communication between said portion of the cylinder and said intake manifold and which valve means when in the final position will shut off communication between said portion of the cylinder and the intake manifold while maintaining communication with the atmosphere.

7. The combination with a motor vehicle including an internal combustion engine and brake mechanism, of a cylinder, a piston reciprocally mounted within the cylinder, means of connection between the piston and said brake mechanism, a pipe connected with a portion of the cylinder on one side of the piston and with the intake manifold of the engine, a check valve in said pipe, a pipe line leading from the intake manifold to that portion of the cylinder on the other side of the piston, a valve controlling the pipe line, which valve is provided with an atmospheric port adapted in one position of the valve to permit atmosphere to enter one end of the cylinder, a by-pass pipe communicated with the first named portion of the cylinder and with said valve, which valve when in another position applies suction force from the first named portion of the cylinder to the second named portion of the cylinder, said valve when in another position communicating the second named portion of the cylinder with the atmosphere and the pipe line with said portion of the cylinder, and when moved in one direction from said position acting to gradually shut off the communication between the pipe line and said portion of the cylinder while maintaining atmospheric communication with said portion of the cylinder.

8. The combination with a motor vehicle including an internal combustion engine, and brake mechanism, of a cylinder, a piston reciprocally mounted within the cylinder, means of connection between the piston and brake mechanism, a valve chamber having a port communicating with the atmosphere, a pipe connected with the portion of the cylinder on one side of the piston and with said valve chamber, a by-pass pipe leading from said valve chamber to a portion of the cylinder on the other side of said piston, a pipe leading from said valve chamber to the intake manifold of the engine, another pipe leading from the intake manifold of the engine to that portion of the cylinder with which the by-pass pipe is connected, a check valve in the last named pipe, and valve mechanism within the valve chamber operating when in one position to shut off communication of the first named manifold connected pipe with the first named pipe and communicating the first named and by-pass pipes with one another to thereby create an equal suction force on both sides of the piston, said valve mechanism when in another position acting to shut off the by-pass pipe and to communicate the first and third named pipes with one another, said valve when in another position acting to communicate the first named portion of the cylinder with the atmosphere while maintaining communication of said portion of the cylinder with the manifold through the first and third named pipes, and when moved in one direction from said last named position acting to gradually cut off communication between said portion of the cylinder and the manifold while maintaining said portion of the cylinder in communication with the atmosphere and when in a final position acting to shut off communication between said portion of the cylinder and the manifold while maintaining said portion of the cylinder in communication with the atmosphere.

9. The combination with a motor vehicle including an internal combustion engine and brake mechanism, of a cylinder, a piston reciprocally mounted within the cylinder, means of connection between the piston and brake mechanism, a valve casing having a port communicating the interior of the casing with the atmosphere, a pipe connected with the portion of the cylinder on one side of the piston and with said valve casing, another pipe leading from said valve to the intake manifold of the engine, another pipe leading from the intake manifold of the engine to that portion of the cylinder on the other side of the piston, a check valve in the last named pipe, a by-pass pipe communicating with the last named portion of the cylinder and with the valve casing, said valve casing having a passage therein with which the first named pipe communicates, and having independent chambers with which the second named and by-pass pipes communicate, also a chamber with which the atmosphere port communicates, a rotary valve disk having a passage therein which is open along one longitudinal side thereof, a valve plate interposed between said valve disk and said chambers and first named passage, which plate is provided with a plurality of ports therein, one for the first named valve passage, and one for each of the chambers, with which ports in said disk the passage in the valve is adapted to register, means for rotating the valve disk to bring the valve passage into registration with the ports for the different chambers, the passage in the valve being at all times in registration with the passage in the casing.

FRANCIS K. GRUSS.